United States Patent [19]

Ramachandran et al.

[11] Patent Number: 5,470,925
[45] Date of Patent: Nov. 28, 1995

[54] PROCESS FOR THE PRODUCTION OF ALKENE POLYMERS

[75] Inventors: Ramakrishnan Ramachandran, Allendale; Loc H. Dao, Bound Brook, both of N.J.

[73] Assignee: The BOC Group, Inc., New Providence, N.J.

[21] Appl. No.: 232,543

[22] Filed: Apr. 22, 1994

Related U.S. Application Data

[63] Continuation-in-part of Ser. No. 129,278, Sep. 30, 1993, abandoned.
[51] Int. Cl.[6] .................................................. C08F 2/34
[52] U.S. Cl. ........................... 526/68; 526/351; 526/352
[58] Field of Search ............................ 526/68, 351, 352

[56] References Cited

U.S. PATENT DOCUMENTS

| 4,917,711 | 4/1990 | Xie et al. | 55/68 |
| 4,935,475 | 6/1990 | Kishimura et al. | 526/169.2 |

FOREIGN PATENT DOCUMENTS 221128  5/1980  Germany .

OTHER PUBLICATIONS

Adsorptive Separation of Propylene–Propane Mixtures–Harri Jarvelin and James R. Fair.

Zeolite Molecular Sieves—Donald W. Breck—Union Carbide Corporation.

Union Carbide Molecular Sieves Hydrocarbon Materials Data Sheets (Propylene Adsorption, Hydrocarbon Adsorption, Propane Adsorption, Ethylene Adsorption, Ethane Adsorption, Vapor Adsorbate Equilibira Data, Capacity for Ethane-Ethlene Mitures).

*Primary Examiner*—Joseph L. Schofer
*Assistant Examiner*—Tom Weber
*Attorney, Agent, or Firm*—Coleman R. Reap; Larry R. Cassett

[57] ABSTRACT

An ethylene stream which contains ethane as an impurity or a propylene stream which contains propane as an impurity is contacted with a polymerization catalyst thereby producing a polymer product containing unreacted ethylene or propylene and the corresponding alkane. A gas mixture containing ethylene or propylene and the corresponding alkane is separated from the polymer product and subjected to adsorption at a temperature of 50° to 200° C. in a bed of adsorbent which selectively adsorbs alkenes, thereby adsorbing substantially all of the propylene or ethylene from the gas mixture. The ethylene or propylene is desorbed from the adsorbent and recycled to the polymerization zone. The process is operated on a low per pass conversion with recycle of unreacted monomer. In the system of the invention the adsorption unit may be upstream or downstream of the polymerization reactor.

43 Claims, 1 Drawing Sheet

PROCESS FOR THE PRODUCTION OF ALKENE POLYMERS

RELATED CASE

This application is a continuation-in-part of application Ser. No. 129,278, filed Sep. 30, 1993, now abandoned.

FIELD OF THE INVENTION

The present invention is directed to a process for producing polymers of ethylene and/or propylene and more particularly to the polymerization of ethylene or propylene or mixtures of ethylene and propylene to produce ethylene or propylene homopolymers or copolymers using as monomer ethylene containing ethane as an impurity or propylene containing propane as an impurity.

BACKGROUND OF THE INVENTION

Ethylene and propylene polymers are produced commercially in the gas or liquid phase by contacting the monomer or monomers with a suitable catalyst. The conditions under which the polymerization is conducted depend upon the particular process employed. For example, high density polyethylene is generally produced at low temperatures and pressures, usually in the range of about 75° to 90° C. and 5 to 10 bar, respectively, while low density polyethylene is produced at high temperatures and pressures, such in the range of about 150° to 250° C. and 150 to 200 bar. Linear low density polyethylene is produced at moderate temperatures and pressures. The feed generally comprises high purity ethylene, and may include other alkenes, depending upon the product properties sought. Similarly, propylene polymerization is carried out at temperatures of about 15° to 100° C. and pressures of about 25 to 50 bar. In both of the above-mentioned processes it is desirable that the purity of the monomeric feed used in the polymerization process be very high, e.g in the neighborhood of 99.5% or more weight percent pure ethylene or propylene, as the case may be. The polymerization process is desirably continuous with the conversion per pass being less than 100%, and often as low as about 7 to 36%.

The alkene monomer, obtained from crude oil during refining, contains considerable amounts of the corresponding alkane, i.e. ethane or propane. The alkene is generally separated from the propane commercially by distillation. Since the boiling points of ethylene and ethane, and propylene and propane are close together, it is difficult and costly to produce polymerization grade ethylene and propylene by distillation. Furthermore, since the adsorption characteristics of the alkenes and corresponding alkanes are similar, it has previously been very difficult to produce suitable ethylene and propylene polymerization feed stock by adsorption.

The difficulty of separation of ethylene from ethane and propylene from propane causes a further complication with respect to polymerization processes. Since the polymerization is generally conducted at less than 100% monomer conversion, it is in the interest of economy to conduct the process on a recycle mode, with unreacted monomer being recycled to the polymerization reactor. Ethane and propane are not affected by the polymerization catalyst; therefore the concentration of ethane or propane in the system would gradually build up as the polymerization proceeds, if measures were not taken to prevent such buildup from occurring. Since efficient and cost effective ethylene-ethane and propylene-propane separation techniques were not previously available, one method of preventing ethane and/or propane from building up in polymerization systems was to continuously or periodically purge a portion of the gaseous polymerization reactor effluent from the system. Unfortunately, part of the valuable alkene monomer was also discharged from the system during the purge.

Continuous efforts are underway to enhance the efficiency of recycle ethylene and propylene polymerization processes. These efforts include investigations for improved procedures for purifying ethylene and propylene feed stock and for separating ethylene and propylene from ethane and propane, respectively, prior to recycling unreacted monomer to the polymerization reactor. The present invention provides such an improved procedure.

SUMMARY OF THE INVENTION

The present invention provides in two embodiments more efficient recycle ethylene and propylene polymerization processes. The processes of the invention comprise the combined steps of ethylene and/or propylene polymerization and high efficiency ethylene and propylene purification.

According to a first embodiment of the invention an ethylene stream which contains ethane as an impurity or a propylene stream which contains propane as an impurity is introduced into a polymerization reactor and contacted with a polymerization catalyst, preferably under continuous polymerization conditions, thereby producing a polymer-unreacted monomer mixture. The polymer-unreacted monomer mixture is continuously withdrawn from the polymerization vessel and volatiles comprising mostly unreacted ethylene and ethane, in the case of ethylene polymerization, and unreacted propylene and propane, in the case of propylene polymerization, are removed from the polymer by flashing the product at an elevated temperature and/or reduced pressure. If desired, additional volatiles may be recovered from the polymer by passing an inert stripping gas, such as nitrogen, through the polymer product. Part or all of the unreacted ethylene or propylene is then separated from the volatiles by pressure swing adsorption or by temperature swing adsorption in one or more adsorption vessels containing beds of adsorbent which preferentially adsorbs alkenes from gas mixtures containing one or more alkenes and one or more alkanes. The adsorption process is operated under conditions which result in the production of an adsorbed stream enriched in the alkene and a non-adsorbed product stream enriched in the alkane, and is preferably operated to retain substantially all of the unreacted alkene in the product gas stream and reject most of the alkane in the stream. The alkene-enriched gas stream obtained upon desorption of the adsorption beds is recycled to the polymerization vessel.

In a second embodiment of the invention an ethylene-ethane gas mixture or a propylene-propane gas mixture is subjected to pressure swing adsorption or temperature swing adsorption in a bed of adsorbent which preferentially adsorbs alkenes, as described above, to produce an ethylene-enriched stream or a propylene-enriched stream. The alkene-enriched stream is then polymerized, thereby producing a polymer-unreacted monomer mixture. The polymer-unreacted monomer mixture is continuously withdrawn from the polymerization vessel and volatiles, comprising mostly unreacted ethylene and ethane or propylene and propane, are removed from the polymer by flashing the polymer product at an elevated temperature and/or reduced pressure and, optionally, by stripping additional volatiles from the polymer by passing an inert stripping gas, such as nitrogen, through the polymer product. The unreacted alkene-containing gas stream is then recycled to the adsorption zone.

The adsorption step is typically carried out at a temperature in the range of about 0° C. to about 250° C., and is preferably carried out at a temperature above about 50° C. The adsorption step is generally carried out at an absolute pressure in the range of about 0.2 to 100 bar, and is preferably carried out at an absolute pressure of about 1 to 50 bar. In a preferred embodiment, the adsorption step is preferably carried out at a temperature of about 50° to about 200° C.

In another preferred embodiment, the adsorbent is a type A zeolite, and in the most preferred embodiment, it is type 4A zeolite.

In other preferred embodiments of the invention the adsorption bed regeneration step is effected by vacuum means or by purging the bed with one or more of an inert gas, the nonadsorbed gas product from the adsorption system or the adsorbed product gas from the adsorption system, or by combinations of vacuum and purge regeneration; and bed repressurization is effected using the propylene-enriched desorbed gas from the adsorption system.

DETAILED DESCRIPTION OF THE INVENTION

Figure 1:
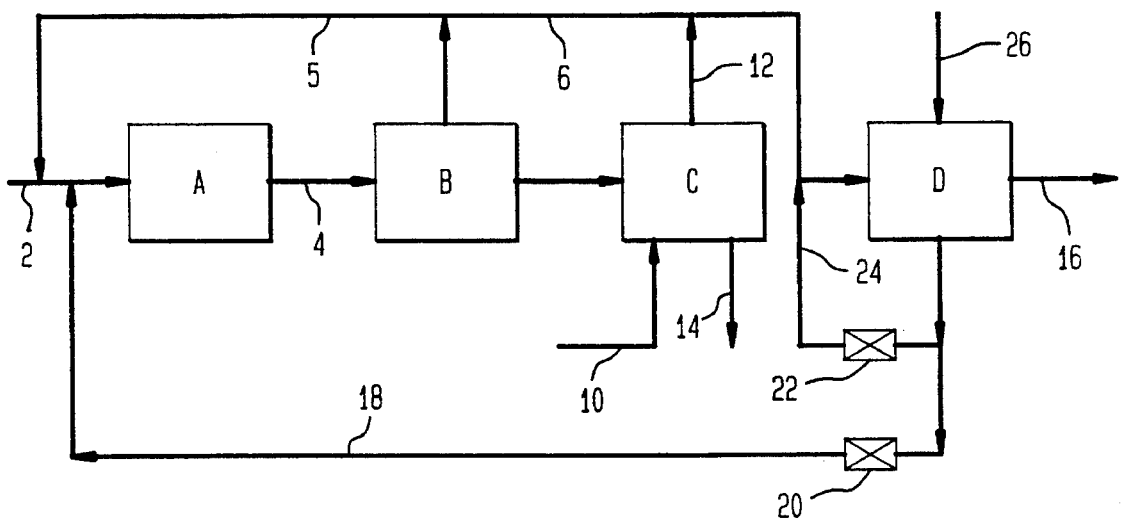
FIG. 1 illustrates, in a block diagram, one embodiment of a system for producing ethylene or propylene polymer in accordance with the present invention.

The invention can be better understood from the accompanying drawings in which the same reference letters or numerals are used to designate the same or similar pieces of equipment in different figures. Auxiliary equipment, including compressors, heat exchangers and valves, not necessary for an understanding of the invention, have been omitted from the drawings to simplify discussion of the invention. In the drawing figures unit A is a polymerization vessel, unit B is a flash zone, optional unit C is a stripping zone and unit D is an propylene separator.

As used in this specification, the term "alkene" means ethylene or propylene and the term "alkane" means ethane or propane. To facilitate description, the invention will be described in particular as it applies to the polymerization of propylene using as feed a propylene gas stream containing propane as an impurity, but the scope of the invention is not to be construed as limited to propylene polymerization. The polymerization can be conducted either in the liquid or gas phase. However, also in the interest of simplification of discussion, the invention will be described as it applies to gas phase polymerization.

Considering FIG. 1 in greater detail, a feed stream comprising propylene, preferably containing at least 99.5 weight percent propylene, the balance being substantially propane and ethane, is introduced into reactor A through line 2. A catalyst and other additives may be introduced into reactor A either with the feed or separately through feed lines not shown in FIG. 1. Reactor A may be any conventional polymerization reactor in which the gas phase polymerization of propylene is carried out, either on a batch or a continuous basis. The propylene feed contacts the catalyst in reactor A at a suitable temperature and pressure and a portion of the propylene is converted to polymer. The details of the polymerization reaction are well known and form no part of the present invention. Typically, the polymerization is conducted in a continuous reactor at temperatures in the range of about 15° to about 100° C., and pressures in the range about 25 to about 50 bar. Typical propylene homo- and copolymerization processes are described in the "Handbook of Chemicals Production Processes", edited by Robert A. Meyers, McGraw-Hill Book Company, 1986, pp 2.5–1 to 2.7–5, the text of which is incorporated herein by reference. The polymer, together with unreacted monomer, leaves reactor A through line 4 and is transported to flash vessel B, wherein volatiles are removed from the polymer.

Flash zone B is a conventional flash vessel or series of flash vessels, typically equipped with heating and agitating means. The separation of volatiles from polymer in flash zone B is generally effected by heating the monomer-containing polymeric product, preferably at a reduced pressure. When flash zone B comprises a series of flash chambers, the individual units may be operated at different pressures, i.e. the pressure in any one chamber in the series is lower than the pressure in the next preceding flash chamber in the series. Part or all of the volatiles from the earlier flash chambers in the series can be recycled to reactor A through recycle lines, and the volatiles from the later flash chambers in the series is generally directed to separator D. In the embodiment illustrated in FIG. 1 all of the unreacted monomer and other volatiles leaving flash zone B may be recycled directly to reactor A through line 5 or transported to separator D through line 6 or part may be recycled to reactor A and the remainder sent to separator D. The polymer, which may still contain some monomer and other volatiles, passes out of vessel B through line 8 and next enters polymer purge unit, C.

Unit C is typically a stripping zone provided with means for providing intimate contact between a stripping gas and the polymeric product moving through unit C. The stripping gas enters stripper C through line 10, passes through the polymer, thereby sweeping unreacted monomer and other volatiles from the polymer, and exits the stripper through line 12. The polymer leaves stripper C through line 14 and is conveyed to downstream polymer processing units, such as extruders (not shown). In the embodiment illustrated in the drawings the stripped monomer and stripping gas mixture pass through lines 12 and 6 and enter separator D. It is not necessary that the gaseous effluent from stripping zone C be transported to separator D with the gaseous effluent from flash zone B, as illustrated. If desired, it can be discharged from the system.

As mentioned above, separator D is a pressure swing adsorption system or a temperature swing adsorption system. It may comprise a single adsorption bed or a battery of beds arranged in series or parallel or in combinations of these. In preferred plants separator D comprises two or more adsorbent beds cycled out of phase to provide a pseudocontinuous recycle of unreacted hydrocarbon to reactor A. Preferred plants comprise two or more beds operated in a cyclic process comprising adsorption at a relatively high temperature and pressure and desorption or bed regeneration at a relatively low pressure or vacuum, in the case of pressure swing adsorption; and at a temperature higher than the adsorption temperature, in the case of temperature swing adsorption.

The function of separator D is to adsorb unreacted propylene from the flash chamber and stripper effluent, which generally contains in addition to unreacted propylene, propane and possibly other saturated and ethylenically unsaturated hydrocarbon impurities, and the stripping gas, if a stripper is used.

As the gaseous effluent from unit B and/or unit C passes through separator D, substantially all of the unreacted propylene is adsorbed by the 4A zeolite adsorbent contained therein. The nonadsorbed gases leave separator D through waste gas discharge line 16. When the unreacted propylene front reaches a predetermined point in separator D, the flow of feed to the particular adsorption unit or units in service is terminated and the regeneration phase of the cycle is begun.

The method of regeneration of the adsorption beds depends upon the type of adsorption process employed. In the case of pressure swing adsorption, the regeneration phase generally includes a countercurrent depressurization step during which the beds are vented countercurrently until they attain atmospheric pressure. Alternatively, they may be evacuated to subatmospheric pressure by means of a vacuum inducing device, such as a vacuum pump (not shown). In either case the propylene desorbed from the beds is recycled to reactor A via line 18. To accomplish this valve 20 is opened and valve 22, located in line 24, is closed.

In some cases, in addition to the countercurrent depressurization step(s), it may be desirable to purge the bed with an inert gas or one of the gas streams exiting separator D. In this event the purge step is usually initiated towards the end of the countercurrent depressurization step, or subsequent thereto. During this step, a nonadsorbable purge gas is introduced into separator D via line 26 and passed countercurrently through the adsorbent beds, thereby forcing desorbed propylene out of separator D through line 18. The purge gas may be nonadsorbed product gas exiting separator D through line 16 or a nonadsorbable gas obtained from a different source, such as an inert permanent gas like nitrogen.

In an alternative mode of operation the propylene desorbed from separator D during the countercurrent depressurization step(s) is recycled through valve 20 and line 18 and back to reactor A, and all or a portion of the purge gas and propylene desorbed from the bed during the purge step is recycled to separator D for reprocessing through the adsorption system. This is accomplished by keeping valve 20 open and valve 22 closed during at least part of the countercurrent depressurization step, and closing valve 20 and opening valve 22 at the point during the purge step when it is desired to recycle the purge gas-propylene mixture directly to the feed inlet of separator D. The advantage of this embodiment is that it permits the amount of purge gas that is recycled to the reactor to be minimized.

The adsorption cycle may contain steps other than the fundamental steps of adsorption and regeneration. For example, it may be advantageous to depressurize the adsorption bed in multiple steps, with the first depressurization product being used to partially pressurize another bed in the adsorption system. This will further reduce the amount of gaseous impurities recycled to reactor A. It may also be desirable to include a cocurrent purge step between the adsorption phase and the regeneration phase. The cocurrent purge is effected by terminating the flow of feed gas into separator D and passing high purity propylene cocurrently into the adsorption bed at adsorption pressure. This has the effect of forcing nonadsorbed gas in the void spaces in separator D toward the nonadsorbed gas outlet, thereby ensuring that the propylene produced during the countercurrent depressurization will be of high purity. The high purity propylene used for the cocurrent purge can be obtained from an intermediate storage facility in line 18 (not shown), when separator D comprises a single adsorber; or from another adsorber that is in the adsorption phase, when separator D comprises multiple adsorbers arranged in parallel and operated out of phase, or from propylene feed line 2.

The adsorbent may be any adsorbent which selectively adsorbs alkenes from a gas mixture containing the alkenes and one or more alkanes. In general, the adsorbent may be alumina, silica, zeolites, carbon molecular sieves, etc. Typical adsorbents include alumina, silica gel, carbon molecular sieves, zeolites, such as type A and type X zeolite, etc. The preferred adsorbents are type A zeolites, and the most preferred adsorbent is type 4A zeolite.

Type 4A zeolite, i.e. the sodium form of type A zeolite, has an apparent pore size of about 3.6 to 4 Angstrom units. This adsorbent provides enhanced selectivity and capacity in adsorbing ethylene from ethylene-ethane mixtures and propylene from propylene-propane mixtures at elevated temperatures. This adsorbent is most effective for use in the invention when it is substantially unmodified, i.e. when it has only sodium ions as its exchangeable cations. However, certain properties of the adsorbent, such as thermal and light stability, may be improved by partly exchanging some of the sodium ions with other cations. Accordingly it is within the scope of the preferred embodiment of the invention to use a type 4A zeolite in which some of the sodium ions attached to the adsorbent are replaced with other metal ions, provided that the percentage of ions exchanged is not so great that the adsorbent loses its type 4A character. Among the properties that define type 4A character are the ability of the adsorbent to selectively adsorb ethylene from ethylene-ethane mixtures and propylene from propylene-propane gas mixtures at elevated temperatures, and to accomplish this result without causing significant oligomerization or polymerization of the alkenes present in the mixtures. In general, it has been determined that up to about 25 percent (on an equivalent basis) of the sodium ions in 4A zeolite can be replaced by ion exchange with other cations without divesting the adsorbent of its type 4A character. Cations that may be ion exchanged with the 4A zeolite used in the alkene-alkane separation include, among others, potassium, calcium, magnesium, strontium, zinc, cobalt, silver, copper, manganese, cadmium, aluminum, cerium, etc. When exchanging other cations for sodium ions it is preferred that less than about 10 percent of the sodium ions (on an equivalent basis) be replaced with such other cations. The replacement of sodium ions may modify the properties of the adsorbent. For example, substituting some of the sodium ions with other cations may improve the stability of the adsorbent.

Another class of preferred adsorbents are those which contain certain oxidizable metal cations, such as copper-containing adsorbents, which possess enhanced adsorptive capacity and selectivity with respect to the preferential adsorption of alkenes from gaseous alkene-alkane mixtures. Suitable adsorbent substrates for manufacturing copper-modified adsorbents include silica gel, and zeolite molecular sieves, such as zeolite type 4A, zeolite type 5A, zeolite type X and zeolite type Y. The manufacture and use of copper-modified adsorbents and examples of suitable copper-containing adsorbents are set forth in U.S. Pat. No. 4,917,711, the disclosure of which is incorporated herein by reference.

The temperature at which the adsorption step is carried out depends upon a number of factors, such as the particular adsorbent being used, e.g. unmodified 4A zeolite, a particular metal-exchanged 4A zeolite or another adsorbent which selectively adsorbs alkenes from alkene-alkane mixtures, and the pressure at which the adsorption is carried out. In general, the adsorption step is carried out at a minimum temperature of about 50° C. and is preferably carried out at a temperature of at least about 70° C. The upper temperature limit at which the adsorption step in unit A is carried out is determined mostly by economics. In general the adsorption step can be carried out at a temperature below the temperature at which the alkene undergoes chemical reaction, such as polymerization. When unmodified 4A zeolite is used as the adsorbent the reaction is generally carried out at or below 250° C., and is preferably carried out at a temperature at or below 200° C. Oxidizable metal-containing adsorbents, such as copper modified adsorbents, are particularly effective at temperatures above about 100° C., for example at temperatures between about 100° C. and 250° C. They are preferably used at temperatures in the range of about 110° to 200° C., and most preferably at temperatures in the range of about 125° to about 175° C.

The pressures at which the adsorption and regeneration steps of the adsorption process are carried out are not critical, and in general these steps can be carried out at pressures which are congruous with the operating conditions of the hydration process, with the limitation, of course, that the adsorption step be carried out at a pressure greater than the regeneration step pressure. Typically, when the adsorption process is pressure swing adsorption the absolute pressure during the adsorption step will range generally from about 0.2 to about 100 bar, and preferably from about 1 to 50 bar, and during the regeneration step will range from about 20 millibar to about 1 bar or more. When the adsorption process is temperature swing adsorption the pressure during both adsorption and desorption is desirably atmospheric or near atmospheric.

When the adsorbed propylene front traveling through the vessel(s) of separator D in which the adsorption step is being carried out reaches the desired point in the vessel(s), the adsorption process in those vessel(s) is terminated and these vessels enter the regeneration mode. During regeneration, the propylene-loaded vessels are depressurized, if the adsorption cycle is pressure swing adsorption, or heated, if a temperature swing adsorption cycle is employed. As the regeneration proceeds propylene-enriched gas is discharged from separator D through line 18. The propylene-enriched gas leaving separator D is desirably high purity propylene, i.e. propylene containing at least 99.0%, and most preferably at least 99.5% propylene.

Figure 2:
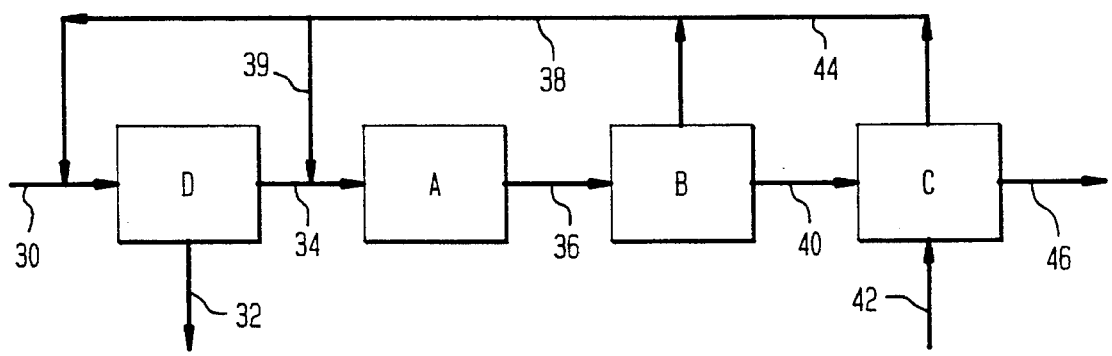
FIG. 2 illustrates, in a block diagram, an alternate embodiment of the system illustrated in FIG. 1.

FIG. 2 illustrates an alternate embodiment of the invention described with reference to FIG. 1. In the FIG. 2 embodiment separator D is positioned upstream of polymerization reactor A. Except for the fact that separator D of FIG. 2 may be larger than separator D of FIG. 1, the equipment units of FIGS. 1 and 2 are substantially identical.

In practicing the process of the invention in the system of FIG. 2, a feed stream comprised substantially of propylene, but containing propane as an impurity, is introduced into separator D through line 30. The feed stream is subjected to pressure swing adsorption or temperature swing adsorption in separator D, as described above. Nonadsorbed propane-enriched product is discharged from separator D through line 32 and desorbed propylene-enriched product is recovered from unit D through line 34. The propylene-enriched product next enters reactor A, wherein the propylene is polymerized under the conditions set forth above. The polymer-containing product is discharged from reactor A through line 36 and it next enters flash zone B, wherein volatiles are separated from the polymer product and removed from unit B through line 38. The volatiles are returned to separator D for recovery of the propylene in the volatiles stream. As was the case in the FIG. 1 embodiment, part of the volatiles from flash zone B can be recycled to reactor A through line 39, if desired. The polymer product is discharged from flash zone B through line 40 and is optionally transferred to stripping zone C for the recovery of additional volatiles from the polymer product. This is accomplished by introducing the stripping gas described above into unit C via line 42 and passing the stripping gas through the polymer in that unit. The stripped propylene and stripping gas are removed from unit C through line 44 and all or a portion of this stream is recycled to separator D through line 38 for recovery of the propylene in the stream. The degassed polymer product is removed from the system through line 46.

It will be appreciated that it is within the scope of the present invention to utilize conventional equipment to monitor and automatically regulate the flow of gases within the system so that it can be fully automated to run continuously in an efficient manner.

Important advantages of the invention are that it permits an impure alkene to be used as feed to the polymerization system and the polymerization process to be run at a relatively low per pass conversion of the alkene feed to the desired product to achieve substantially improved selectivity. It will be appreciated that a system that achieves enhanced selectivity, and hence increased overall yield of a desired product, is highly beneficial.

The invention is further illustrated by the following examples in which, unless otherwise indicated, parts, percentages and ratios are on a volume basis.

EXAMPLE I

This example is a hypothetical example depicting the polymerization of propylene using as monomer feed a propylene stream containing propane as an impurity. The feed stream, comprised of 99.5 wt. % propylene and 0.5 wt. % propane, is introduced into a polymerization system similar to the system illustrated in FIG. 1. The flash zone comprises two serially connected flash chambers, the first of which is operated at a pressure lower than the pressure in the polymerization reactor, and the second of which is operated at a pressure lower than the pressure in the first flash chamber. All of the volatiles from the first flash chamber are recycled to the polymerization reactor and part of the volatiles from the second flash chamber are recycled to the reactor and the remaining portion is sent to the separator. The polymerization is conducted in the presence of an aluminum tetrachloride-triethyl aluminum catalyst (at a temperature of 110° C. and an absolute pressure of 27 bar. The adsorption process is carried out at an adsorption pressure of 0.7 bar and a bed regeneration pressure of 300 mbar.

The results of the polymerization run are recorded in Table I. In this Table, stream 1 is the fresh feed flow to the system; stream 2 is the combined flow of the fresh feed flow and the flows of all recycle streams; stream 3 is the polymerization reactor effluent flow; stream 4 is the flow of recycle to the polymerization reactor from the first flash chamber; stream 5 is the flow of material from the flash chamber to the second flash chamber; stream 6 is the flow of recycle from the second flash chamber to the polymerization reactor; stream 7 is the flow of volatiles from the second flash chamber to the pressure swing adsorption system; stream 8 is the flow of recycle from the pressure swing adsorption system to the polymerization reactor; and stream 9 is the flow of waste gas from the pressure swing adsorption system.

TABLE I

| STREAM | Propylene wt. | % | Propane wt. | % | Polymer wt. | % | Total wt. |
|---|---|---|---|---|---|---|---|
| 1 | 22,059.49 | 99.50 | 110.85 | 0.50 | | | 22,170.35 |
| 2 | 34,161.49 | 92.34 | 2,832.47 | 7.66 | | | 36,993.97 |
| 3 | 12,161.49 | 7.66 | 2,832.47 | 32.87 | 22,000.00 | 59.47 | 36,993.97 |
| 4 | 10,674.14 | 81.11 | 2,486.06 | 18.89 | | | 13,160.20 |
| 5 | 1,487.35 | 81.11 | 346.41 | 18.89 | | | 1,833.76 |
| 6 | 892.41 | 81.11 | 207.85 | 18.89 | | | 1,100.26 |
| 7 | 594.94 | 81.11 | 138.56 | 18.89 | | . | 733.50 |
| 8 | 535.45 | 95.08 | 27.71 | 4.92 | | | 563.16 |
| 9 | 59.49 | 34.93 | 110.85 | 65.07 | | | 170.35 |

EXAMPLE II

This example is a hypothetical example depicting the polymerization of ethylene using as monomer feed a ethylene stream containing ethane as an impurity. The feed stream, comprised of 99.5% ethylene and 0.5% ethane, is introduced into a polymerization system similar to the system illustrated in FIG. 1. The flash zone comprises two serially connected flash chambers, the first of which is operated at a pressure lower than the pressure in the polymerization reactor, and the second of which is operated at a pressure lower than the pressure in the second flash chamber. All of the volatiles from the first flash chamber are recycled to the polymerization reactor and part of the volatiles from the second flash chamber are recycled to the reactor and the remaining portion is sent to the separator. The polymerization is conducted in the presence of a aluminum tetrachloride-triethyl aluminum catalyst (at a temperature of 110° C. and an absolute pressure of 27 bar. The adsorption process is carried out at an adsorption pressure of 0.7 bar and a bed regeneration pressure of 300 mbar.

The results of this polymerization run are recorded in Table II. In Table II, stream 1 is the fresh feed flow to the system; stream 2 is the combined flow of the fresh feed flow and the flows of all recycle streams to the polymerization reactor; stream 3 is the flow of recycle to the polymerization reactor from the flash chamber; stream 4 is the flow of volatiles from the flash chamber to the pressure swing adsorption system; stream 5 is the flow of recycle from the pressure swing adsorption system to the polymerization reactor; and stream 6 is the flow of waste gas from the pressure swing adsorption system.

As illustrated in the examples, most of the alkene entering the adsorption system is recovered and recycled to the polymerization reactor while most of the alkane is removed from the system.

Although the invention has been described with particular reference to specific experiments, these experiments are merely exemplary of the invention and variations are contemplated. For example, the polymerization process can be practiced in a manner to produce propylene copolymers, such as high impact ethylene-propylene copolymers. Similarly, the process of the invention may be practiced in equipment arrangements other than those illustrated in the drawings. The scope of the invention is limited only by the breadth of the appended claims.

We claim:

1. A process for the production of a propylene polymer comprising the steps:

(a) contacting a propylene-propane mixture with a polymerization catalyst in a reaction zone under conditions which result in the production of a product containing a propylene polymer, unreacted propylene and propane;

(b) separating a gas mixture comprising unreacted propylene and propane from said product;

(c) selectively adsorbing propylene from said gas mixture by passing said gas mixture through an adsorption zone containing an adsorbent which selectively adsorbs propylene;

(d) regenerating said adsorbent, thereby producing a propylene-enriched gas stream; and

TABLE II

| Comp. | Stream | | | | | |
|---|---|---|---|---|---|---|
| | 1 lbmol/hr | 2 lbmol/hr | 3 lbmol/hr | 4 lbmol/hr | 5 lbmol/hr | 6 lbmol/hr |
| $C_2H_4$ | 2177.04 | 2785.714 | 480.536 | 160.179 | 128.143 | 32.036 |
| $C_2H_6$ | 0.4355 | 1.9576 | 1.468 | 0.4893 | 0.05383 | 0.435 |
| $N_2$ | 0.0000 | 11.2125 | 10.091 | 4.4850 | 1.1213 | 3.364 |
| Propane | | 10.1660 | 8.9700 | 2.9900 | 1.1960 | 1.7940 |
| Propylene | | 16.1460 | 13.4550 | 4.4850 | 2.6910 | 1.794 |
| Et Oxide | | 0.0119 | 0.00961 | 0.00320 | 0.0022 | 0.00096 |
| Vinyl Acet | | 0.1826 | 0.1442 | 0.0481 | 0.0384 | 0.0096 |
| Total | 2177.476 | 2825.391 | 514.67 | 172.68 | 133.25 | 39.43 |

(e) recycling at least part of said propylene-enriched gas stream to said reaction zone.

2. The process of claim 1, wherein step (b) is carried out by flashing unreacted propylene and propane from said product.

3. The process of claim 1, wherein step (b) is carried out by first flashing unreacted propylene and propane from said product and then stripping unreacted propylene and propane from said product.

4. The process of claim 1, wherein at least part of the gas mixture from step (b) is recycled to said reaction zone and at least part of the propylene-enriched gas stream from step (e) is recycled to said adsorption zone.

5. The process of claim 1, wherein said gas mixture also contains ethylene and unreacted ethylene is recovered with the unreacted propylene and recycled to said reaction zone.

6. A process for the production of a propylene polymer product comprising the steps:

(a) selectively adsorbing propylene from a propylene-propane feed gas by passing said feed gas through an adsorption zone containing an adsorbent which selectively adsorbs propylene;

(b) regenerating said adsorbent, thereby producing propylene-enriched gas;

(c) contacting said propylene-enriched gas with a polymerization catalyst in a reaction zone under conditions which result in the production of a product containing propylene polymer, unreacted propylene and propane;

(d) separating a gas mixture comprising unreacted propylene and propane from said product; and (e) recycling said gas mixture to said adsorption zone.

7. The process of claim 6, wherein step (d) is carried out by flashing unreacted propylene and propane from said product.

8. The process of claim 6, wherein step (d) is carried out by first flashing unreacted propylene and propane from said product and then stripping unreacted propylene and propane from said product.

9. The process of claim 1 or claim 6, wherein the adsorption step is conducted at a temperature above about 50° C.

10. The process of claim 9, wherein the adsorption step is conducted at a temperature in the range of about 50° to about 250° C. and an absolute pressure of about 0.2 to about 100 bar.

11. The process of claim 10, wherein the adsorbent is selected from alumina, type 4A zeolite, type 5A zeolite, type 13X zeolite, type Y zeolite and mixtures of these.

12. The process of claim 10, wherein the adsorbent contains an oxidizable metal ion.

13. The process of claim 12, wherein said oxidizable metal ion is copper ion.

14. The process of claim 13, wherein the adsorption step is carried out at a temperature between about 100° and about 200° C.

15. The process of claim 11, wherein said adsorbent is type 4A zeolite.

16. The process of claim 15, wherein said adsorbent contains exchangeable cations other than sodium ions, but at a level insufficient to divest the adsorbent of its type 4A character.

17. The process of claim 15, wherein the adsorption step is carried out at a temperature in the range of about 70° to about 170° C. and an absolute pressure of about 1 to 50 bar.

18. The process of claim 1 or claim 6, wherein the adsorption step is carried out at a temperature in the range of about 50° to about 200° C. and an absolute pressure in the range of about 0.2 to 100 bar.

19. The process of claim 1 or claim 6, wherein said propylene polymer is selected from propylene homopolymer and ethylene-propylene copolymer.

20. The process of any one of claims 2, 3, 7 or 8, wherein the adsorption step is carried out at a temperature in the range of about 70° to about 170° C. and an absolute pressure of about 1 to 50 bar.

21. A process for the production of an ethylene polymer comprising the steps:

(a) contacting an ethylene-ethane mixture with a polymerization catalyst in a reaction zone under conditions which result in the production of a product containing an ethylene polymer, unreacted ethylene and ethane;

(b) separating a gas mixture comprising unreacted ethylene and ethane from said product;

(c) selectively adsorbing ethylene from said gas mixture by passing said gas mixture through an adsorption zone containing an adsorbent which selectively adsorbs alkenes;

(d) regenerating said adsorbent, thereby producing an ethylene-enriched gas stream; and (e) recycling at least part of said ethylene-enriched gas stream to said reaction zone.

22. The process of claim 21, wherein step (b) is carried out by flashing unreacted ethylene and ethane from said product.

23. The process of claim 21, wherein step (b) is carried out by first flashing unreacted ethylene and ethane from said product and then stripping unreacted ethylene and ethane from said product.

24. The process of claim 21, wherein a first portion of said ethylene-enriched gas stream is recycled to said reaction zone and a second portion of said ethylene-enriched gas stream is recycled to said adsorption zone.

25. A process for the production of an ethylene polymer product comprising the steps:

(a) selectively adsorbing ethylene from an ethylene-ethane feed gas by passing said feed gas through an adsorption zone containing an adsorbent which selectively adsorbs alkenes;

(b) regenerating said adsorbent, thereby producing ethylene-enriched gas;

(c) contacting said ethylene-enriched gas with a polymerization catalyst in a reaction zone under conditions which result in the production of a product containing ethylene polymer, unreacted ethylene and ethane;

(d) separating unreacted ethylene and ethane from said product; and (e) recycling at least part of said unreacted ethylene and ethane to said adsorption zone.

26. The process of claim 25, wherein step (d) is carried out by flashing unreacted ethylene and ethane from said product.

27. The process of claim 25, wherein step (d) is carried out by first flashing unreacted ethylene and ethane from said product and then stripping unreacted ethylene and ethane from said product.

28. The process of claim 21 or claim 25, wherein the adsorption step is conducted at a temperature above about 50° C.

29. The process of claim 28, wherein the adsorption step is conducted at a temperature in the range of about 50° to about 250° C. and an absolute pressure of about 0.2 to 100 bar.

30. The process of claim 29, wherein the adsorbent contains an oxidizable metal ion.

31. The process of claim 30, wherein said oxidizable metal ion is copper ion.

32. The process of claim 31, wherein the adsorption step is carried out at a temperature between about 100° and about 200° C.

33. The process of claim 29, wherein the adsorbent is selected from alumina, type 4A zeolite, type 5A zeolite, type 13X zeolite, type Y zeolite and mixtures of these.

34. The process of claim 33, wherein said adsorbent is type 4A zeolite.

35. The process of claim 34, wherein said adsorbent contains exchangeable cations other than sodium ions, but at a level insufficient to divest the adsorbent of its type 4A character.

36. The process of claim 34, wherein the adsorption step is carried out at a temperature in the range of about 70° to about 170° C. and an absolute pressure of about 1 to 50 bar.

37. The process of claim 34, wherein said zeolite type 4A contains copper ion and the adsorption step is carried out at a temperature in the range of about 100° to about 200° C.

38. The process of any one of claims 1, 6, 21 or 25, wherein the adsorption and regeneration steps comprise a pressure swing adsorption cycle.

39. The process of claim 34, wherein the zeolite type 4A is at least partly regenerated by countercurrent depressurization.

40. The process of claim 39, wherein the zeolite type 4A is further regenerated by depressurization to subatmospheric pressure by means of vacuum.

41. The process of claim 40, wherein the zeolite type 4A is further regenerated by purging the bed with an inert gas, the nonadsorbed product gas, the desorbed product gas or combinations of these.

42. The process of claim 15, wherein the zeolite type 4A contains cations selected from potassium, calcium, magnesium, strontium, zinc, cobalt, silver, copper, manganese, cadmium and mixtures of these.

43. The process of claim 34, wherein the zeolite type 4A contains cations selected from potassium, calcium, magnesium, strontium, zinc, cobalt, silver, copper, manganese, cadmium and mixtures of these.

* * * * *